(12) United States Patent
Cotton et al.

(10) Patent No.: US 9,267,011 B2
(45) Date of Patent: Feb. 23, 2016

(54) COMPOSITION AND METHOD FOR MAKING A CAVITATED BIO-BASED FILM

(75) Inventors: Robert Nolan Cotton, McKinney, TX (US); Kenneth Scott Laverdure, Plano, TX (US); Deepali Palta, Dallas, TX (US); Brad Dewayne Rodgers, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 484 days.

(21) Appl. No.: 13/425,076

(22) Filed: Mar. 20, 2012

(65) Prior Publication Data

US 2013/0251988 A1     Sep. 26, 2013

(51) Int. Cl.
| | |
|---|---|
| *C08K 3/26* | (2006.01) |
| *B29C 55/12* | (2006.01) |
| *C08L 67/04* | (2006.01) |
| *B29C 47/00* | (2006.01) |
| *B29C 55/14* | (2006.01) |
| *B29C 55/16* | (2006.01) |
| *B29K 67/00* | (2006.01) |
| *B29C 47/06* | (2006.01) |

(52) U.S. Cl.
CPC ............... *C08K 3/26* (2013.01); *B29C 47/0057* (2013.01); *B29C 55/12* (2013.01); *B29C 47/0004* (2013.01); *B29C 47/065* (2013.01); *B29C 55/14* (2013.01); *B29C 55/143* (2013.01); *B29C 55/16* (2013.01); *B29K 2067/046* (2013.01); *B29K 2867/046* (2013.01); *B29K 2995/006* (2013.01); *B29K 2995/0056* (2013.01); *Y10T 428/2817* (2013.01)

(58) Field of Classification Search
None
See application file for complete search history.

(56) References Cited

U.S. PATENT DOCUMENTS

| | | |
|---|---|---|
| 3,113,888 A | 12/1963 | Gold |
| 3,217,957 A | 11/1965 | Jarvie et al. |
| 3,258,386 A | 6/1966 | Blythe |
| 3,438,428 A | 4/1969 | Balamuth et al. |
| 3,459,610 A | 8/1969 | Dijkers et al. |
| 3,477,970 A | 11/1969 | Beeman |
| 3,498,798 A | 3/1970 | Baur |
| 3,647,111 A | 3/1972 | Stager |
| 3,657,033 A | 4/1972 | Sager |
| 4,198,256 A | 4/1980 | Andrews |

(Continued)

FOREIGN PATENT DOCUMENTS

| | | |
|---|---|---|
| CN | 1386631 A | 12/2002 |
| DE | 19523530 C1 | 9/1996 |

(Continued)

OTHER PUBLICATIONS

Agarwal, Mukul, et al. "Characterization of the Degradation of Polylactic Acid Polymer in a Solid Substrate Environment," Biotechnol. Prog. 1998, vol. 14, pp. 517-526 (10 pages).

(Continued)

*Primary Examiner* — Jeffrey Wollschlager
(74) *Attorney, Agent, or Firm* — James R. Gourley; Colin P. Cahoon; Carstens & Cahoon, LLP

(57) ABSTRACT

Composition and method for making a multi-layer bio-based film having one or more cavitated layers. In one aspect, the multilayer flexible film has polylactic acid, an inorganic filler, and a cavitation stabilizer making up at least one film layer. In one aspect, the barrier web has a cavitated bio-based film layer. In another aspect, the print web has a cavitated bio-based film layer.

5 Claims, 3 Drawing Sheets

(56) References Cited

U.S. PATENT DOCUMENTS

| | | |
|---|---|---|
| 4,373,982 A | 2/1983 | Kreager |
| 4,414,045 A | 11/1983 | Wang |
| 4,418,841 A | 12/1983 | Eckstein |
| 4,517,790 A | 5/1985 | Kreager |
| 4,551,371 A | 11/1985 | Eckstein |
| 4,572,753 A | 2/1986 | Bach |
| 4,647,332 A | 3/1987 | Ranger |
| 4,859,513 A | 8/1989 | Gibbons |
| 4,892,911 A | 1/1990 | Genske |
| 4,975,133 A | 12/1990 | Gochermann |
| 4,982,872 A | 1/1991 | Avery |
| 5,057,182 A | 10/1991 | Wuchinich |
| 5,059,804 A | 10/1991 | Fink |
| 5,108,807 A | 4/1992 | Tucker |
| 5,153,061 A | 10/1992 | Cavagna |
| 5,155,604 A | 10/1992 | Miekka |
| 5,180,765 A | 1/1993 | Sinclair |
| 5,192,620 A | 3/1993 | Chu |
| 5,205,473 A | 4/1993 | Coffin |
| 5,213,858 A | 5/1993 | Tanner et al. |
| 5,216,043 A | 6/1993 | Sipinen |
| 5,230,963 A | 7/1993 | Knoerzer |
| 5,296,070 A | 3/1994 | Take |
| 5,332,586 A | 7/1994 | DiMino |
| 5,391,423 A | 2/1995 | Wnuk |
| 5,458,933 A | 10/1995 | Suskind |
| 5,487,940 A | 1/1996 | Bianchini |
| 5,500,459 A | 3/1996 | Hagemeyer |
| 5,506,036 A | 4/1996 | Bergerioux |
| 5,508,113 A | 4/1996 | Knoerzer |
| 5,512,338 A | 4/1996 | Bianchini |
| 5,525,421 A | 6/1996 | Knoerzer |
| 5,540,962 A | 7/1996 | Suskind |
| 5,552,013 A | 9/1996 | Ehlert et al. |
| 5,587,048 A | 12/1996 | Streisel et al. |
| 5,604,042 A | 2/1997 | Bianchini |
| 5,631,066 A | 5/1997 | O'Brien |
| 5,654,039 A | 8/1997 | Wenzel et al. |
| 5,679,421 A | 10/1997 | Brinton, Jr. |
| 5,731,093 A | 3/1998 | Chang |
| 5,736,204 A | 4/1998 | Suskind |
| 5,747,633 A | 5/1998 | Ito |
| 5,750,225 A | 5/1998 | Petty |
| 5,756,651 A | 5/1998 | Chen |
| 5,766,637 A | 6/1998 | Shine |
| 5,776,842 A | 7/1998 | Wood |
| 5,837,383 A | 11/1998 | Wenzel et al. |
| 5,849,374 A | 12/1998 | Gruber |
| 5,895,723 A | 4/1999 | Utz |
| 5,908,918 A | 6/1999 | Chen |
| 5,916,970 A * | 6/1999 | Lee, Jr. .............. C08L 71/123 524/279 |
| 5,939,467 A | 8/1999 | Wnuk |
| 5,948,546 A | 9/1999 | Bafford |
| 5,985,772 A | 11/1999 | Wood |
| 6,003,670 A | 12/1999 | Beer |
| 6,025,028 A | 2/2000 | Asrar |
| 6,027,677 A | 2/2000 | Ostapchenko |
| 6,033,747 A | 3/2000 | Shiotani |
| 6,036,796 A | 3/2000 | Halbert |
| 6,071,618 A | 6/2000 | Cook |
| 6,080,478 A | 6/2000 | Karhuketo |
| 6,132,822 A | 10/2000 | Overcash |
| 6,146,508 A | 11/2000 | Gopalraja |
| 6,168,857 B1 | 1/2001 | Andersen |
| 6,176,953 B1 | 1/2001 | Landreth |
| 6,183,814 B1 | 2/2001 | Nangeroni et al. |
| 6,193,911 B1 | 2/2001 | Hunt |
| 6,200,404 B1 | 3/2001 | Andersen |
| 6,207,792 B1 | 3/2001 | Gruber |
| 6,232,389 B1 | 5/2001 | Feeney |
| 6,235,825 B1 | 5/2001 | Yoshida |
| 6,245,437 B1 | 6/2001 | Shiiki |
| 6,248,430 B1 | 6/2001 | Toyoda |
| 6,285,922 B1 | 9/2001 | Bloss |
| 6,294,047 B1 | 9/2001 | Chakar |
| 6,301,860 B1 | 10/2001 | Gunderman |
| 6,338,870 B1 | 1/2002 | Jaccoud |
| 6,350,531 B1 | 2/2002 | Sugimoto |
| 6,358,576 B1 | 3/2002 | Adur |
| 6,361,609 B1 | 3/2002 | Ouellette |
| 6,387,211 B1 | 5/2002 | Chakar |
| 6,492,613 B2 | 12/2002 | Bollinger et al. |
| 6,511,563 B2 | 1/2003 | Roylance |
| 6,544,607 B1 | 4/2003 | Kuroki |
| 6,547,929 B2 | 4/2003 | Bobsein |
| 6,573,340 B1 | 6/2003 | Khemani |
| 6,574,944 B2 | 6/2003 | Capodieci |
| 6,576,294 B1 | 6/2003 | Phillips |
| 6,600,008 B1 | 7/2003 | Kobayashi |
| 6,645,584 B1 | 11/2003 | Kuusipalo |
| 6,649,732 B2 | 11/2003 | Kobayashi |
| 6,660,008 B1 | 12/2003 | Foerster |
| 6,660,211 B2 * | 12/2003 | Topolkaraev et al. ........ 264/444 |
| 6,677,048 B2 | 1/2004 | Karhuketo |
| 6,709,718 B2 | 3/2004 | O'Brien |
| 6,716,499 B1 | 4/2004 | Vadhar |
| 6,740,731 B2 | 5/2004 | Bigg |
| 6,769,229 B2 | 8/2004 | Kinigakis |
| 6,811,826 B2 | 11/2004 | Rule et al. |
| 6,815,079 B2 * | 11/2004 | Rosenbaum et al. ......... 428/480 |
| 6,824,632 B2 | 11/2004 | Blanchard |
| 6,863,644 B1 | 3/2005 | Cook |
| 6,877,975 B2 | 4/2005 | Wuchinich |
| 6,942,821 B2 | 9/2005 | Davrit |
| 6,960,374 B1 | 11/2005 | Terada |
| 6,974,612 B1 | 12/2005 | Frisk |
| 6,977,113 B2 | 12/2005 | Kody |
| 6,984,443 B2 | 1/2006 | Kuroki |
| 7,060,142 B2 | 6/2006 | Yamamoto |
| 7,128,969 B2 | 10/2006 | Busch |
| 7,132,490 B2 | 11/2006 | Obuchi et al. |
| 7,160,977 B2 | 1/2007 | Hale |
| 7,172,814 B2 | 2/2007 | Hudson |
| 7,173,080 B2 | 2/2007 | Yamada |
| 7,214,414 B2 | 5/2007 | Khemani |
| 7,223,359 B2 | 5/2007 | Torkelson |
| 7,351,449 B2 | 4/2008 | Hunt |
| 7,351,785 B2 | 4/2008 | Matsumoto |
| 7,368,160 B2 | 5/2008 | Inglis |
| 7,422,782 B2 | 9/2008 | Haedt |
| 7,514,528 B2 | 4/2009 | Kauffman |
| 7,520,959 B2 | 4/2009 | Kikuchi |
| 7,707,803 B2 | 5/2010 | Mori et al. |
| 7,718,718 B2 | 5/2010 | Kanzawa |
| 7,771,551 B2 | 8/2010 | Schroeder |
| 7,785,682 B2 | 8/2010 | Sato et al. |
| 7,794,555 B2 | 9/2010 | LaFond |
| 7,842,761 B2 * | 11/2010 | Flynn et al. .................. 525/450 |
| 7,854,994 B2 | 12/2010 | Henderson-Rutgers |
| 7,943,218 B2 | 5/2011 | Knoerzer |
| 7,951,436 B2 | 5/2011 | Knoerzer |
| 7,951,438 B2 * | 5/2011 | Lee et al. ..................... 428/35.8 |
| 8,105,667 B2 | 1/2012 | Knoerzer |
| 8,201,606 B2 | 6/2012 | Specht |
| 8,225,583 B2 | 7/2012 | Waldherr |
| 8,507,084 B2 | 8/2013 | Deng |
| 8,734,933 B2 | 5/2014 | Paolilli et al. |
| 8,795,803 B2 | 8/2014 | Paolilli et al. |
| 8,859,056 B2 | 10/2014 | O'Neill et al. |
| 2001/0001284 A1 | 5/2001 | Shaw |
| 2002/0014318 A1 | 2/2002 | Bobsein |
| 2002/0098341 A1 | 7/2002 | Schiffer |
| 2002/0160201 A1 | 10/2002 | Ohkura |
| 2003/0008136 A1 | 1/2003 | Bliznyuk |
| 2003/0162013 A1 | 8/2003 | Topolkaraev |
| 2003/0166748 A1 | 9/2003 | Khemani |
| 2003/0193104 A1 | 10/2003 | Melican |
| 2003/0215644 A1 | 11/2003 | Deshpande |
| 2004/0029258 A1 | 2/2004 | Heaney |
| 2004/0076778 A1 | 4/2004 | Mori |
| 2004/0115424 A1 | 6/2004 | Cowton |
| 2004/0185287 A1 | 9/2004 | Reighard |
| 2004/0229327 A1 | 11/2004 | Agblevor |

(56) References Cited

U.S. PATENT DOCUMENTS

| | | | |
|---|---|---|---|
| 2005/0096422 A1 | 5/2005 | Torkelson | |
| 2005/0112363 A1* | 5/2005 | Ning | 428/327 |
| 2005/0136202 A1 | 6/2005 | Kendig | |
| 2005/0194110 A1 | 9/2005 | Richardson | |
| 2006/0019045 A1 | 1/2006 | Bourgeois | |
| 2006/0046006 A1 | 3/2006 | Bastion et al. | |
| 2006/0057260 A1 | 3/2006 | Barry | |
| 2006/0069234 A1 | 3/2006 | Kauffman | |
| 2006/0099436 A1 | 5/2006 | Schwark | |
| 2006/0110615 A1 | 5/2006 | Karim | |
| 2006/0144905 A1 | 7/2006 | Oblak | |
| 2006/0159860 A1 | 7/2006 | Korowicki | |
| 2006/0177674 A1 | 8/2006 | Aritake | |
| 2006/0194010 A1 | 8/2006 | Hiscock | |
| 2006/0207295 A1 | 9/2006 | Huenemann | |
| 2006/0275563 A1 | 12/2006 | Duffy | |
| 2006/0286323 A1 | 12/2006 | Siegel | |
| 2007/0023123 A1 | 2/2007 | Sorensen | |
| 2007/0037912 A1 | 2/2007 | Mohanty | |
| 2007/0059541 A1 | 3/2007 | Yoshida | |
| 2007/0154719 A1 | 7/2007 | Meijlink et al. | |
| 2007/0158012 A1 | 7/2007 | Heil | |
| 2007/0184220 A1 | 8/2007 | Cleveland | |
| 2007/0224368 A1 | 9/2007 | Hara | |
| 2007/0259139 A1 | 11/2007 | Furneaux | |
| 2008/0038560 A1 | 2/2008 | Knoerzer | |
| 2008/0069988 A1 | 3/2008 | Sato | |
| 2008/0070047 A1 | 3/2008 | Rehkugler | |
| 2008/0073505 A1 | 3/2008 | Niu | |
| 2008/0107847 A1 | 5/2008 | Yamane et al. | |
| 2008/0131616 A1 | 6/2008 | Besson | |
| 2008/0241500 A1 | 10/2008 | Hoegg | |
| 2009/0017240 A1 | 1/2009 | Charbonnel et al. | |
| 2009/0022919 A1 | 1/2009 | Chicarella | |
| 2009/0061126 A1 | 3/2009 | Knoerzer | |
| 2009/0081396 A1 | 3/2009 | Hokari et al. | |
| 2009/0142614 A1 | 6/2009 | Mori | |
| 2009/0148713 A1* | 6/2009 | Lee et al. | 428/458 |
| 2009/0148715 A1 | 6/2009 | Lee | |
| 2009/0194450 A1 | 8/2009 | Dabadie | |
| 2009/0199964 A1 | 8/2009 | Fayet | |
| 2009/0200359 A1 | 8/2009 | Chen | |
| 2009/0220794 A1 | 9/2009 | O'Neill | |
| 2009/0250171 A1 | 10/2009 | Wieduwilt | |
| 2009/0253871 A1* | 10/2009 | Flynn et al. | 525/418 |
| 2009/0269580 A1 | 10/2009 | Shiba et al. | |
| 2009/0286090 A1 | 11/2009 | Ting | |
| 2009/0311544 A1* | 12/2009 | Lee et al. | 428/458 |
| 2009/0324917 A1 | 12/2009 | Wang | |
| 2009/0324972 A1 | 12/2009 | Hoffman et al. | |
| 2010/0009208 A1 | 1/2010 | Lee | |
| 2010/0040904 A1 | 2/2010 | Cloutier | |
| 2010/0062269 A1 | 3/2010 | Ogita | |
| 2010/0072104 A1 | 3/2010 | Kohl | |
| 2010/0101722 A1 | 4/2010 | Suto | |
| 2010/0147466 A1 | 6/2010 | Sans Marimon | |
| 2010/0151130 A1 | 6/2010 | Ammerlaan | |
| 2010/0178394 A1 | 7/2010 | Exner | |
| 2010/0178523 A1 | 7/2010 | Iyengar | |
| 2010/0184891 A1 | 7/2010 | Akutsu et al. | |
| 2010/0209614 A1 | 8/2010 | Sakata | |
| 2010/0221560 A1 | 9/2010 | Knoerzer | |
| 2010/0330382 A1* | 12/2010 | Dou et al. | 428/457 |
| 2011/0005959 A1 | 1/2011 | Van Pujenbroek | |
| 2011/0027590 A1 | 2/2011 | Abe | |
| 2011/0072766 A1 | 3/2011 | Haus | |
| 2011/0081543 A1 | 4/2011 | Lee | |
| 2011/0104437 A1 | 5/2011 | Yamamura | |
| 2011/0200844 A1 | 8/2011 | Fayne | |
| 2011/0244185 A1* | 10/2011 | Dou et al. | 428/156 |
| 2012/0111476 A1 | 5/2012 | Bang | |
| 2012/0141766 A1* | 6/2012 | Paulino et al. | 428/304.4 |
| 2012/0219790 A1 | 8/2012 | Mount | |
| 2012/0288693 A1 | 11/2012 | Stanley et al. | |
| 2013/0101831 A1 | 4/2013 | Knoerzer et al. | |
| 2013/0101855 A1 | 4/2013 | Cham | |
| 2013/0122280 A1* | 5/2013 | Yokota et al. | 428/318.6 |

FOREIGN PATENT DOCUMENTS

| | | |
|---|---|---|
| DE | 10347015 A1 | 4/2005 |
| EP | 00333390 | 9/1980 |
| EP | 0058571 A1 | 8/1982 |
| EP | 0229476 A1 | 7/1987 |
| JP | 2000-185381 | 7/2000 |
| JP | 2003-191425 | 7/2003 |
| JP | 2003-276144 | 9/2003 |
| JP | 2004106314 | 4/2004 |
| JP | 2004-256570 | 9/2004 |
| JP | 2004-351629 | 12/2004 |
| JP | 2007-083409 | 4/2007 |
| JP | 2011-63002 | 3/2011 |
| WO | 9601736 | 1/1996 |
| WO | 9618544 A1 | 6/1996 |
| WO | 9631303 | 10/1996 |
| WO | 2004-093883 A2 | 11/2004 |
| WO | 20061029835 A1 | 3/2006 |
| WO | 2007/047133 A1 | 4/2007 |
| WO | 2012/085060 A1 | 4/2013 |

OTHER PUBLICATIONS

Devlieger, J.J., "Green plastics for food packaging," TNO Industrial Technology, Chapter 24, pp. 519-534, The Netherlands, date unknown.

Goldsberry, Clare, "The Greening of an Industry: PLA film coatings replacing thermoplastics," Modern Plastics Worldwide magazine, Feb. 2007, pp. 54 and 56, United States.

Kolybaba, M., "Biodegradable Polymers: Past, Present, and Future" The Society for Engineering in Agricultural, Food, and Biological Systems, Paper No. RRV03-00007, Oct. 2003, 15 pages.

Liu, Lillian,"Bioplastics in Food Packaging: Innovative Technologies for Biodegradable Packaging" San Jose State University Packaging Engineering, Feb. 2006, 13 pages.

Malwitz, Matthew M., et al., "Orientation of Platelets in Multilayered Nanocomposite Polymer Films," Journal of Polymer Science: Part B: Polymer Physics, vol. 41, 3237-3248 (2003) © Wiley Periodicals, Inc., United States.

NatureWorks LLC PLA Polymer 4032D "Biaxially Oriented Films—High Heat" pp. 1-3, © 2005.

NatureWorks LLC Health and Safety, "Material Safety Data Sheet" pp. 1-10, Jul. 19, 2006.

"Nanophasen-Materialen In: Rompp Lexikon Chemie, 10. Auflage, 1998, Thieme Verlag, StuttgartISBN: 3-13-734910-9vol. 4, p. 2804 (3 pages)."

"PCT International Search Report dated Nov. 22, 2013, from PCT Application No. PCT/US13/47106 (7 pages)."

"PCT International Search Report dated Dec. 2, 2013, from PCT Application No. PCT/US13/47128 (8 pages)."

"Smook, Gary A.,The Handbook for Pulp and Paper Technologists, Chapter 14—Secondary Fiber, pp. 205-217."

"Somiya, Satoshi, andOoike, Takanobu." "Degradation phenomena under water environment of cotton yarn reinforced Polylactic-acid," "T. Proulx (ed.), Time Dependent Constitutive Behavior and Fracture/Failure Processes, vol. 3, Conference Proceedings of the Society for Experimental Mechanics Series 15, DOI 10.1007/978-1-4419-9794-4_27, The Society for Experimental Mechanics, Inc. 2011, pp. 175-182".

Tokiwa, Yutaka "Biodegradability of Plastics," Int. J. of Mol. Sci. Sep. 2009, 10(9):3722-3724, published online Aug. 26, 2009 (18 pages).

PCT International Search Report dated Feb. 21, 2014, from PCT Application No. PCT/US13/53478 (6 pages).

PCT International Search Report dated Feb. 21, 2014, from PCT Application No. PCT/US13/53473 (6 pages).

Machine translation of German Patent Publication No. DE10347015 A1 published on Apr. 28, 2005 (5 pages).

(56) References Cited

OTHER PUBLICATIONS

Machine translation of Japanese Patent Publication No. 2011/063002 A2 published on Mar. 31, 2011 (18 pages).
Kim & Chang translation of excerpt of Japanese Patent Publication No. 2011/063002 A2 published on Mar. 31, 2011 (1 page).
Hashimoto et al. (JP 2000-185381) English translation, Apr. 7, 2000 (10 pages).
PCT International Search Report dated Apr. 3, 2014 from PCT Application No. PCT/US13/68512 (8 pages).

* cited by examiner

COMPOSITION AND METHOD FOR MAKING A CAVITATED BIO-BASED FILM

BACKGROUND OF THE INVENTION

1. Technical Field

The present invention relates to a cavitated bio-based flexible film material that can be used in products and to a method of making the cavitated bio-based flexible film.

2. Description of Related Art

Multi-layered film structures made from petroleum-based products originating from fossil fuels are often used in flexible packages where there is a need for its advantageous barrier, sealant, and graphics-capability properties. Barrier properties in one or more layers are important in order to protect the product inside the package from light, oxygen or moisture. Such a need exists, for example, for the protection of foodstuffs, which may run the risk of flavor loss, staling, or spoilage if insufficient barrier properties are present to prevent transmission of such things as light, oxygen, or moisture into the package. The sealant properties are important in order to enable the flexible package to form an airtight or hermetic seal. Without a hermetic seal, any barrier properties provided by the film are ineffective against oxygen, moisture, or aroma transmission between the product in the package and the outside. A graphics capability is needed because it enables a consumer to quickly identify the product that he or she is seeking to purchase, allows food product manufacturers a way to label the nutritional content of the packaged food, and enables pricing information, such as bar codes, to be placed on the product.

One prior art multi-layer or composite film used for packaging potato chips and like products is illustrated in FIG. 1 which is a schematic of a cross section of the multi-layer film 100 illustrating each individual substantive layer. Each of these layers functions in some way to provide the needed barrier (layer 118), sealant (layer 119), and graphics capability properties. The graphics layer 114 is typically used for the presentation of graphics that can be reverse-printed and viewed through a transparent outer base layer 112. Like numerals are used throughout this description to describe similar or identical parts, unless otherwise indicated. The outer base layer 112 is typically oriented polypropylene ("OPP") or polyethylene terephthalate ("PET"). A metal layer disposed upon an inner base layer 118 provides the required barrier properties. It has been found and is well-known in the prior art that metalizing a petroleum-based polyolefin such as OPP or PET reduces the moisture and oxygen transmission through the film by approximately three orders of magnitude. Petroleum-based OPP is typically utilized for base layers 112, 118. A sealant layer 119 disposed upon the OPP layer 118 enables a hermetic seal to be formed at a temperature lower than the melt temperature of the OPP. A lower melting point sealant layer 119 is desirable because melting the metalized OPP to form a seal could have an adverse effect on the barrier properties. Typical prior art sealant layers 119 include an ethylene-propylene copolymer and an ethylene-propylene-butene-1 ter-polymer. A glue or laminate layer 115, typically a polyethylene extrusion, is required to adhere the outer base layer 112 with the inner, product-side base layer 118. Thus, at least two base layers of petroleum-based polypropylene are typically required in a composite or multi-layered film.

Other materials used in packaging are also typically petroleum-based materials such as polyolefin extrusions, adhesive laminates, and other such materials, or a layered combination of the above.

FIG. 2 demonstrates schematically the formation of material, in which the OPP layers 112, 118 of the packaging material are separately manufactured, then formed into the final material 100 on an extrusion laminator 200. The OPP layer 112 having graphics 114 previously applied by a known graphics application method such as flexographic or rotogravure is fed from roll 212 while OPP layer 118 is fed from roll 218. At the same time, resin for PE laminate layer 115 is fed into hopper 215a and through extruder 215b, where it will be heated to approximately 600° F. and extruded at die 215c as molten polyethylene 115. This molten polyethylene 115 is extruded at a rate that is congruent with the rate at which the petroleum-based OPP materials 112, 118 are fed, becoming sandwiched between these two materials. The layered material 100 then runs between chill drum 220 and nip roller 230, ensuring that it forms an even layer as it is cooled. The pressure between the laminator rollers is generally set in the range of 0.5 to 5 pounds per linear inch across the width of the material. The large chill drum 220 is made of stainless steel and is cooled to about 50-60° F., so that while the material is cooled quickly, no condensation is allowed to form. The smaller nip roller 230 is generally formed of rubber or another resilient material. Note that the layered material 100 remains in contact with the chill drum 220 for a period of time after it has passed through the rollers, to allow time for the resin to cool sufficiently. The material can then be wound into rolls (not specifically shown) for transport to the location where it will be used in packaging. Generally, it is economical to form the material as wide sheets that are then slit using thin slitter knives into the desired width as the material is rolled for shipping.

Once the material is formed and cut into desired widths, it can be loaded into a vertical form, fill, and seal machine to be used in packaging the many products that are packaged using this method. FIG. 3 shows an exemplary vertical form, fill, and seal machine that can be used to package snack foods, such as chips. This drawing is simplified, and does not show the cabinet and support structures that typically surround such a machine, but it demonstrates the working of the machine well. Packaging film 310 is taken from a roll 312 of film and passed through tensioners 314 that keep it taut. The film then passes over a former 316, which directs the film as it forms a vertical tube around a product delivery cylinder 318. This product delivery cylinder 318 normally has either a round or a somewhat oval cross-section. As the tube of packaging material is pulled downward by drive belts 320, the edges of the film are sealed along its length by a vertical sealer 322, forming a back seal 324. The machine then applies a pair of heat-sealing jaws 326 against the tube to form a transverse seal 328. This transverse seal 328 acts as the top seal on the bag 330 below the sealing jaws 326 and the bottom seal on the bag 332 being filled and formed above the jaws 326. After the transverse seal 328 has been formed, a cut is made across the sealed area to separate the finished bag 330 below the seal 328 from the partially completed bag 332 above the seal. The film tube is then pushed downward to draw out another package length. Before the sealing jaws form each transverse seal, the product to be packaged is dropped through the product delivery cylinder 318 and is held within the tube above the transverse seal 328.

Petroleum-based prior art flexible films comprise a relatively small part of the total waste stream produced when compared to other types of packaging. However, because petroleum films are environmentally stable, they have a relatively low rate of degradation. Consequently, such films can survive for long periods of time in a landfill. Another disadvantage of petroleum-based films is that they are made from oil, which many consider to be a limited, non-renewable resource. Consequently, a need exists for a bio-based flexible film made from a renewable resource. In one embodiment, the bio-based film should be food safe and have the requisite barrier properties to store a low moisture shelf-stable food for an extended period of time without the product staling. The bio-based film should have the requisite sealable and coefficient of friction properties that enable it to be used on existing vertical form, fill, and seal machines. In one aspect, the bio-based film should be compostable.

SUMMARY OF THE INVENTION

In one embodiment of the invention, a composite for use in a multi-layer flexible film is disclosed and claimed, said composite comprising a cavitated bio-based layer comprising polylactic acid, an inorganic filler, and a cavitation stabilizer. In a preferred embodiment, the cavitation stabilizer comprises a plasticizer or impact modifier. The cavitation stabilizer may further comprise a low molecular weight lactic acid polymer.

In another embodiment, the cavitated bio-based layer comprises between about 10% and about 50% by weight of said inorganic filler. In still another embodiment, the cavitation stabilizer comprises between about 5% and about 20% by weight of said cavitated bio-based layer.

The inventive composite may further comprise an adhesion layer and a heat seal layer. A snack food package may comprise the inventive composite of claim 1 adhered to a print web having an ink layer. The print web may comprise the inventive composite, or be not cavitated and substantially free of impact modifier.

In another embodiment, the present invention is a method for making a cavitated bio-based composite comprising the steps of: providing a molten sheet comprising inorganic filler, polylactic acid, and a cavitation stabilizer; orienting said sheet in a machine direction; and orienting said sheet in a transverse direction. The bio-based composite may be co-extruded with a sealant layer, or co-extruded with a primer layer.

In another embodiment, the orienting in said machine direction orients the film at least 2×, and wherein said orienting in said transverse direction orients the film at least 3×. In still another embodiment, the orienting steps produce a film having a density between about 16% and about 29% lower than a film substantially free of inorganic filler and cavitation stabilizer. When inorganic filler is used, it may comprise calcium carbonate.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

In one embodiment, the present invention is directed towards a cavitated bio-based film for use in a multi-layer flexible film package. As used herein, the bio-based film comprises a polymer film where at least about 80% of the polymer film by weight of the total amount of polymer used in the film is made from a non-petroleum feedstock. Inorganic fillers are hereby excluded from the total amount of polymer used for purposes of determining whether a film is "bio-based." In one embodiment, the polymer film consists essentially of a bio-based film. Non-limiting examples of bio-based films include polylactic acid (hereinafter "PLA") and polyhydroxyalkanoates (hereinafter "PHA"). PLA is a compostable bio-based film polymer and requires elevated temperatures for degradation to occur. PHA does not require elevated temperatures for degradation to occur.

Figure 1:
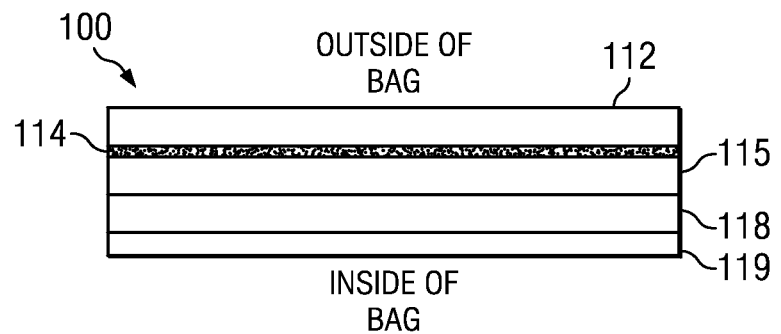
FIG. 1 depicts a cross-section of an exemplary prior art flexible film.
Figure 2:
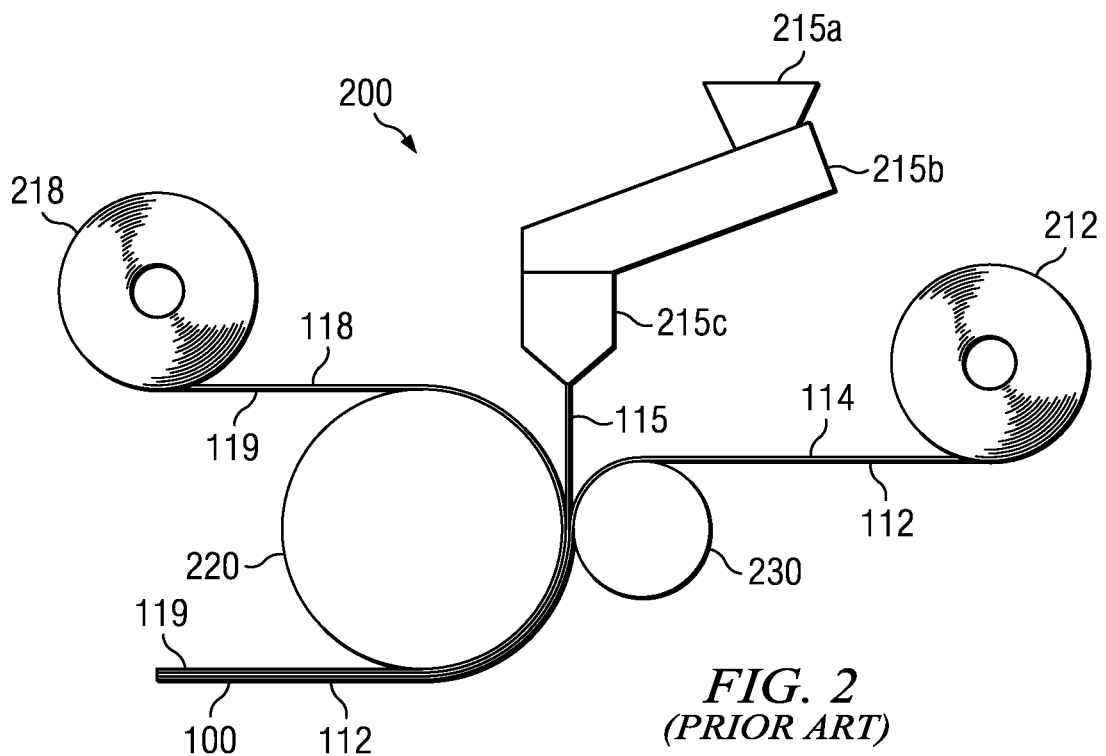
FIG. 2 depicts the exemplary formation of a prior art flexible film.
Figure 3:
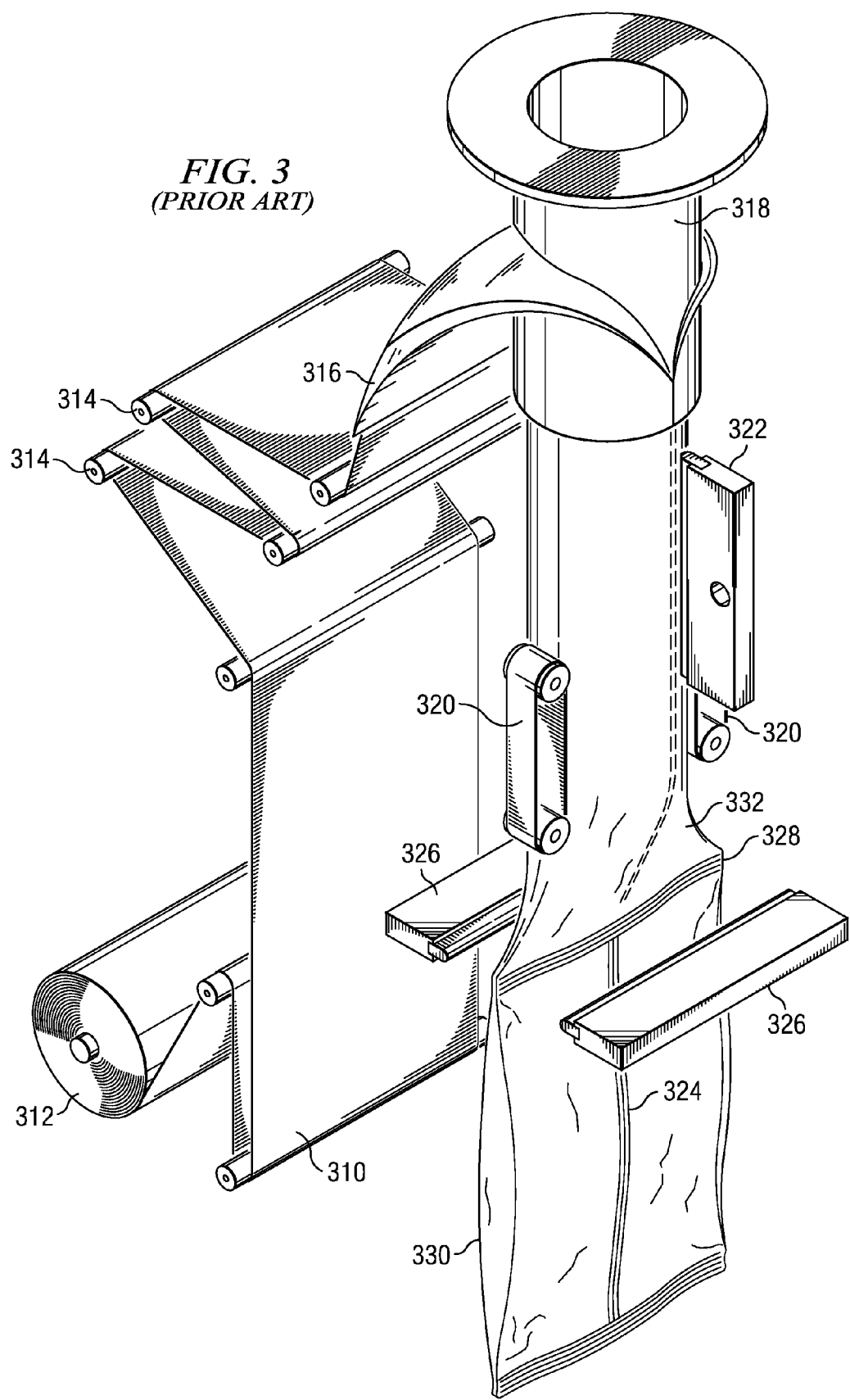
FIG. 3 depicts a vertical form, fill, and seal machine that is known in the prior art.
Figure 4A:
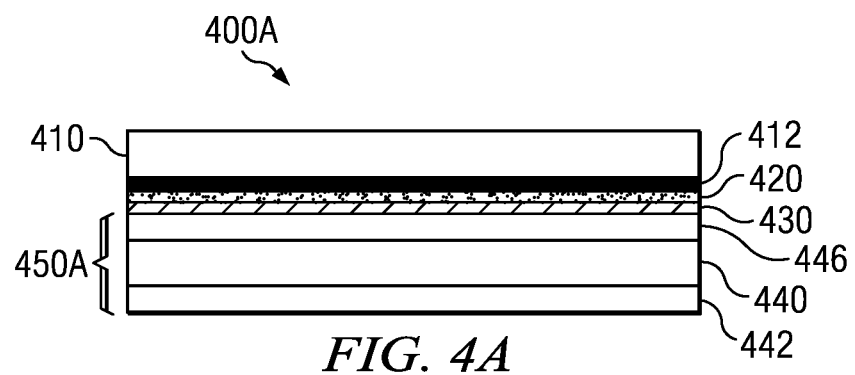
FIG. 4a depicts a magnified schematic cross-section of a bio-based multi-layer flexible film made according to one embodiment of the invention.

As described above with reference to FIG. 2, multi-layered packaging films can be produced by adhering a product side composite layer to an outside composite layer. As depicted in FIG. 4A, the product side layer composite 450A comprises three layers of polymers: a barrier web 440 with a sealant layer 442 on one side, and a barrier adhesion layer 446 on the other side. A barrier layer 430 can be applied to the barrier adhesion layer. Typically, the barrier web layer 440 makes up about 80% by weight of the polymer used in the product side layer composite 450A. In one embodiment, all three product side composite layers are made using bio-based polymers, such as PLA.

Typically the product side layer can be manufactured by co-extruding the three layers together to produce a multilayered film sheet. The film sheet exiting the extruder is then cooled on cooling rollers and stretched (oriented) in the machine direction on stretching rollers running at successively increasing speeds. The machine stretched film is then stretched (oriented) in the transverse direction in a heated transverse stretching unit. The biaxially oriented film can then be combined with an outside composite layer, or rolled or cut into sheets for later combination with an outside composite layer.

One problem with PLA flexible films is that such films are brittle and stiffer than the OPP typically used for flexible film packages. Packages made from flexible films having high levels of PLA are therefore relatively noisy as compared to prior art petroleum-based films. Additionally, bio-based polymers are currently more expensive per unit than petroleum-based films. Therefore, it would be advantageous to reduce the amount of bio-based polymers present in the film without negatively affecting the performance and features of the film. The inventors have discovered that many of these problems can mitigated by using a cavitated bio-based flexible film.

A cavitated bio-based film has a plurality of voids dispersed throughout the barrier web layer 440. A void is similar to a bubble inside the polymer layer, or a small area where no polymer is present. To create the voids, inorganic fillers such as calcium carbonate are added to the bio-based polymer resin prior to the extrusion step. During the orientation or stretching steps, the polymer surrounding the inorganic fillers expands away from the filler particles, which do not stretch or bond well to the polymer resin, leaving behind filler particles inside voids. The voids in the bio-based film provide a lower tensile or secant modulus of the film layer. Consequently, cavitated bio-based films do not crinkle as much when folded because voids allow the material to fold, and therefore are not as loud when deformed under normal handling. Furthermore, the films are less dense than uncavitated films, which reduces the amount of polymer resin required to create a film of desired thickness.

Even though cavitated films are advantageously less noisy and less dense that their uncavitated counterparts, the process of manufacturing a cavitated bio-based film presents unique challenges. Applicants herein have discovered that the brittle nature of bio-based films, especially PLA, causes the voids created during the stretching steps described above to form cracks in the polymer layer, which readily propagate through the film causing it to tear in the stretching equipment. Without any additives, Applicants found that a bio-based PLA film with only inorganic fillers included, could only be stretched about 3× in the machine direction, and 4× in the transverse direction. Even with this level of stretching, tearing occurred too frequently to allow a practitioner to commercialize a cavitated bio-based film.

To overcome this problem, Applicants added a cavitation stabilizer to the barrier web layer resin, along with the inorganic filler material. Therefore, in one embodiment of the present invention, the barrier web 440 comprises a cavitated bio-based layer comprising PLA, one or more inorganic fillers, and a cavitation stabilizer. Preferably, the cavitation stabilizer is also bio-based.

Non-limiting examples of inorganic fillers include, but are not limited to talc, clays, silicon dioxide, diatamaceous earth, Kaolin, micas gypsum, potassium nitrate, sodium chloride, metal chlorides, dolomite, bentonite, montmorillonite, metal sulfates, ammonium nitrate, sodium nitrate, titanium dioxides, and calcium carbonate.

A non-limiting example of a bio-based polymer additive that functions as a cavitation stabilizer is a low molecular weight nylon polymer resin. Another non-limiting example of a bio-based polymer additive that functions as a cavitation stabilizer is a low molecular weight lactic acid polymer resin.

Without being limited by theory in the broadest aspects of the present invention, it is believed that the cavitation stabilizers act as impact modifiers or plasticizers, or preferably both, to the barrier web layer. Impact modifiers are used in the polymer art to describe polymer additives that act to prevent the propagation of cracks in plastics. It is believed that the cavitation stabilizers identified above stabilize the voids created during stretching operations to ensure that any cracks which develop do not propagate and form tears in the polymer sheet. Plasticizers embed themselves between polymer chains, increasing the flexibility of the polymers to which they are added. Plasticizers stabilize the voids created during the stretching operation by preventing cracks from forming at the edges of the voids.

Again, bio-based cavitation stabilizers are preferred. A bio-based additive is sourced from a non-petroleum feedstock. Bio-based polymer additives degrade along with the bio-based polymer to which they are added, whereas petroleum-based impact modifiers such as ethylene-acrylate copolymers do not. For example, ethylene-acrylate copolymers are non-compostable under ASTM D6400 standards when used at levels in excess of 5% by weight of the PLA.

The combination of inorganic fillers and a cavitation stabilizer permit a cavitated PLA film to be made when the bio-based layer comprising PLA, inorganic fillers, and cavitation stabilizer is oriented in the machine and transverse directions. Further, the bio-based layer comprising PLA, inorganic fillers and polycondensation polymers can be oriented 3× in the machine direction and up to 8× in the transverse direction without tearing the polymer sheet.

In one embodiment, the bio-based barrier web 440 comprises between about 25% and about 90% PLA by total weight of the barrier web layer 440. In one embodiment, the bio-based barrier web 440 comprises between about 10% and about 25% of an inorganic filler, and more preferably between about 12% and about 20% by weight of the bio-based barrier web 440. Using less than about 10% by weight of the bio-based barrier web 440 of an inorganic filler fails to create the void space required for a desired amount of cavitation upon orientation in the transverse direction. In one embodiment, the bio-based barrier web 440 comprises at least about 12% by weight of an inorganic filler material such as calcium carbonate to ensure sufficient cavitation upon orientation of the bio-based barrier layer 440.

In one embodiment, at least about 5% of a cavitation stabilizer by weight of the bio-based barrier web layer 440 is necessary to permit the desired level of orientation. In a preferred embodiment, at least about 10% of a cavitation stabilizer by weight of the barrier web layer 440 is used. For example, NATUREWORKS 4032 brand PLA film with inorganic filler added can be oriented about 2× in the machine direction and about 4× in the transverse direction without the addition of a cavitation stabilizer. When the bio-based barrier web 440 comprises at least about 5% by weight cavitation stabilizer, higher levels of orientation can be achieved, including up to 3× in the machine direction and 7× in the transverse direction. However, at levels above about 20% by weight of bio-based barrier layer 440, the cavitation stabilizer does not provide any additional benefit in processability of the product side composite layer.

EXAMPLE FILMS

Applicants herein created several experimental and inventive films according to the principles set forth above. The properties of these inventive films are detailed in Table 1 below, and compared to a film made using only CaCO3 as the inorganic filler. The percentages shown are on a weight basis in the barrier web layer only. The percent cavitation was calculated by subtracting the film density from the resin density, dividing by the resin density, and multiplying by 100. The density improvement was calculated by subtracting the inventive film density from an uncavitated control PLA film density (1.24 grams per cubic centimeter), dividing by the control density, and multiplying by 100.

TABLE 1

Inventive Film Comparison Table

| Cavitation Stabilizer | Percent CaCO$_3$ | Orientation (MD × TD) | Percent Cavitation | Density Improvement |
|---|---|---|---|---|
| None | 25% | 2.3 × 4.3 | 21% | 9% |
| SELUMA (10%) | 25% | 3 × 7 | 37% | 28% |
| LAPOL (10%) | 25% | 2.3 × 4.3 | 38% | 29% |
| LAPOL (5%) | 12.5% | 2.3 × 4.3 | 23% | 18% |
| LAPOL (10%) | 25% | 2.8 × 3 | 38% | 29% |
| LAPOL (5%) | 12.5% | 2.8 × 3 | 22% | 16% |
| LAPOL (10%) | 25% | 2 × 3 | 26% | 16% |

As can be seen in Table 1, the inventive films that utilize cavitation stabilizers exhibited between about 2 and 3 times the percentage density improvement over control than the film that included no cavitation stabilizers. Thus, the inventive film shows a significant improvement in film density. In one embodiment, the oriented film of the present invention has a density between about 16% and about 29% lower than a film substantially free of inorganic filler and cavitation stabilizer.

In one embodiment, any polymer or polymer blend that processes similar to the bio-based film on an orientation line, that has a relatively smooth surface (such as provided by an amorphous PET v. a crystalline PET, described in more detail below) and that has polar chemical groups, can be used as a suitable adhesion layer 446. Polar chemical groups are desirable in the adhesion layer 446 because they are attracted to the metal or metalloid barrier layer 430, and it is believed that polar chemical groups such as hydroxyl groups covalently bond to form a metal oxide or metalloid oxide upon metalization. Consequently, alcohol blends using an ethylene vinyl alcohol ("EVOH") formula and polyvinyl alcohol ("PVOH") are desirable, as are polymers having polar amide groups such as nylon. Further, amorphous PET and polyglycolic acid ("PGA") having polar carbonyl groups can also be used. Consequently, in one embodiment, an adhesion layer 446 comprises one or more polar films selected from amorphous PET, PGA, various nylons including amorphous nylon, EVOH, nylon/EVOH blends, PVOH, PVOH/ethylene acrylic acid (hereinafter "EAA") blends, and a primer.

In one embodiment, an adhesion layer 446 comprises an amorphous or glassy PET. As used herein, the terms amorphous PET and glassy PET are synonymous and defined as a PET having Tg of about 80° C. In one embodiment, amorphous PET is PET that is less than about 75% crystalline in nature. The determination of crystallinity is well known in the art and can be performed with differential scanning calorimetry (DSC) in accordance with ASTM D3418 (melting points) or ASTM E1356 (Tg). Because amorphous PET has a much smoother outer bonding surface than crystalline PET, and because the oxygen bearing groups are randomly distributed at the surface, amorphous PET provides a much better bonding surface than crystalline PET for metals such as aluminum. Further, crystalline PET has a much higher melting point and does not process in an efficient manner with PLA on an orientation line.

In one embodiment, the adhesion layer 446 is co-extruded with a bio-based barrier web 440. In one embodiment, an adhesion layer 446 comprising PET can be coextruded with the bio-based barrier web 440 and a barrier layer 430 can be applied to the adhesion layer 446 by methods known in the art.

In one embodiment, the adhesion layer 446 comprises an EVOH formula that can range from a low hydrolysis EVOH to a high hydrolysis EVOH. Below depicts EVOH formulas in accordance with various embodiments of the present invention.

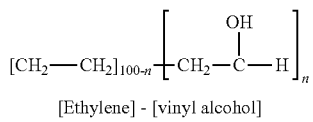

[Ethylene] - [vinyl alcohol]

As used herein a low hydrolysis EVOH corresponds to the above formula wherein n=25. As used herein, a high hydrolysis EVOH corresponds to the above formula wherein n=80. High hydrolysis EVOH provides oxygen barrier properties but is more difficult to process. The adhesion layer 446 comprising the EVOH formula can be coextruded with the bio-based barrier web 440 and the barrier layer 430 can be applied by methods known in the art and listed above. In one embodiment, the adhesion layer 446 comprising EVOH is coated via a gravure or other suitable method onto the bio-based barrier web 440 and the barrier layer 430 can be applied onto the adhesion layer 446.

In one embodiment, the adhesion layer 446 comprises both nylon and EVOH. In such embodiment, a nylon layer is co-extruded with a bio-based barrier web 440 such as PLA and then an EVOH coating is applied onto the nylon layer, via gravure or other suitable method.

In one embodiment, the adhesion layer 446 comprises a PVOH coating that is applied to the bio-based barrier web 440 as a liquid and then dried. A barrier layer 430 can then be applied to the adhesion layer 446 comprising the dried PVOH coating.

In one embodiment, the adhesion layer 446 is applied as a solution comprising EAA and PVOH that is coated onto the bio-based barrier web 440 as a liquid and then dried. In one embodiment, a PVOH and EAA solution coating can be applied to the PLA after the PLA has been stretched or axially oriented in the machine direction. Consequently, PLA can be extruded and allowed to cool after extrusion prior to being stretched in the machine direction. A coating comprising PVOH and EAA can then be applied. For example, the solution can comprise 0.1-20% PVOH and EAA and 80-99.9% water. In one embodiment, roughly equal amounts of PVOH and EAA are used. In one embodiment, the solution comprises about 90% water, about 5% PVOH, and about 5% EAA. After the coating has been applied, the film can then be heated and subsequently stretched in the transverse direction. Such process provides an even coating for a barrier layer 430.

FIG. 4a depicts a magnified schematic cross-section of a multi-layer packaging film made according to one embodiment of the invention. In one embodiment, a bio-based barrier web 440 is coated, by any suitable method including use of a mayer rod or gravure, with an adhesion layer 446 comprising a primer. As used herein, a primer is defined as any suitable coating that has polar chemical groups and also functions as a surface modifier that provides a smooth surface for a barrier layer 430. Examples of suitable primers that can be used in accordance with various embodiments of the present invention include, but are not limited to, an epoxy, maleic anhydride, ethylenemethacrylate ("EMA"), and ethylenevinylacetate ("EVA"). In one embodiment, the adhesion layer 446 is coated with a barrier layer 430. Any suitable barrier layer 430 including, but not limited to, a metal oxide such as aluminum oxide, or a metalloid oxide such as silicon dioxide can be used. In one embodiment, another layer (not shown) comprising doped metal oxide or metalloid oxide is placed is placed onto the barrier layer 430 to provide additional barrier properties. For example, in one embodiment, the adhesion layer 446 comprises an epoxy on the bio-based barrier web 440 to provide a smooth surface for subsequent depositions. In one embodiment a barrier layer 430 comprising silicon oxide is then coated, via flame deposition in one embodiment, onto the epoxy layer and provides an oxygen barrier. A doped zinc-silicon oxide can then be coated, via flame deposition in one embodiment, onto the barrier layer 430 comprising silicon oxide.

Additives can also be used to facilitate the application of the barrier layer 430 such as a metal to the adhesion layer 446 or to facilitate application of the adhesion layer 446 to a bio-based barrier web 440. As used herein, the term "additives" is not limited to chemical additives and can include surface treatment including, but not limited to, corona treatment. In one embodiment, use of the adhesion layer 446 makes it possible to provide a barrier layer 430 with no additives.

The film composite 450A comprising a sealant layer 442 and adhesion layer 446 and a bio-based barrier web 440 described above can then be metalized to form a barrier layer 430 and then be adhered to a bio-based print web 410 with a bio-based or other suitable adhesive 420.

An outer bio-based print web 410 can be made by extruding a bio-based polymer into a film sheet. In one embodiment, the bio-based print web 410 has been oriented 3× in the machine direction and 4× in the transverse direction. In one embodiment, PLA print web 410 used comprises a thickness of between about 70 gauge and about 120 gauge. In one embodiment, the bio-based print web 410 is not cavitated. Cavitation causes a clear film to become opaque. Consequently, a cavitated print web 410 needs to be printed on the outside facing portion of the print web 410. In one embodiment, because the print web is not cavitated, a graphic layer 412 is reverse printed onto the bio-based print web 410 by a known graphics application method such as flexographic or rotogravure to form a graphics layer 412. In an alternative embodiment (not shown), a graphic image is printed onto the outside facing portion of the print web 410 that comprises a bio-based cavitated polymer having an inorganic filler and a bio-based polycondensation polymer. The same amounts and types of inorganic fillers and polycondensation polymers can be used as discussed above. In one embodiment, the bio-based print web 410 comprises multiple layers to enhance printing and coefficient of friction properties. In one embodiment, the bio-based outer print web 410 comprises one or more layers consisting essentially of PLA.

In one embodiment, after a barrier layer 430 has been applied to the adhesion layer 446, the bio-based print web 410 can be adhered to the barrier layer 430 with any suitable adhesive 420 such as LDPE. In one embodiment, a bio-based adhesive 420 is used. As used herein, the term "bio-based adhesive" means a polymer adhesive where at least about 80% of the polymer layer by weight is derived from a non-petroleum feedstock. The adhesive layer 420 can comprise any suitable bio-based adhesive such as a modified PLA biopolymer. In one embodiment, a starch based glue can be used as a suitable adhesive.

An optional sealant layer 442 can also be provided. In one embodiment, the sealant layer 442 comprises an amorphous PLA, such as a 4060 PLA layer available from NATUREWORKS that is co-extruded with the bio-based barrier web 440. In the embodiment shown in FIG. 4a, the inside sealant layer 442 can be folded over and then sealed on itself to form a tube having a fin seal for a back seal. The fin seal is accomplished by the application of heat and pressure to the film. Alternatively, a thermal stripe can be provided on the requisite portion of the bio-based barrier web 440 to permit a lap seal to be used.

A cavitation stabilizer need not be added to the sealant layer 442 or to the adhesion layer 446 in accordance with the present invention, because inorganic fillers need not be used in those layers with the present invention. Inorganic fillers could pose a product contamination hazard if used in the product side sealant layer 442. Also, neither layer surrounding the barrier web layer 440 must be cavitated because the barrier web layer 440 typically comprises about 80% of the product side composite 450A. Therefore, the majority of the density reduction and noise dampening can be captured by modifying the barrier web layer 440, as described above. In one embodiment, the sealant layer 442 and the adhesion layer are substantially free of an inorganic filler or a cavitation stabilizer, with the understanding that each layer can remain substantially free of these components even if some migration from the barrier web layer 440 to the outer layers does occur.

COMPARATIVE EXAMPLE

Referring back to the Example depicted in FIG. 4A, in one embodiment, the multi-layer flexible film 400A has a print web 410 comprising an uncavitated biaxially oriented 3×4 film (oriented 3× in the machine direction and 4× in the transverse direction). The composite 450A comprises a bio-based barrier web 440 that was co-extruded with an adhesion layer 446 comprising NATUREWORKS PLA 4060D and a sealant layer 442 also comprising NATUREWORKS PLA 4060D and anti-block. The bio-based barrier web 440 was made with a composition consisting essentially of 70% NATUREWORKS 4032 PLA by weight, 20% calcium carbonate by weight and 10% low molecular weight bio-based polycondensation polymer by weight. The composite was oriented 4× in the machine direction and 7× in the transverse direction to create a cavitated composite 450A. A barrier layer 430 comprising aluminum was deposited onto the cavitated composite 450A and the metalized composite was adhered to the reverse printed uncavitated print web with a polyurethane adhesive. This multi-layer flexible film 400A was then made into a snack food package having two transverse seals and a back seal by methods well known in the art.

Figure 4B:
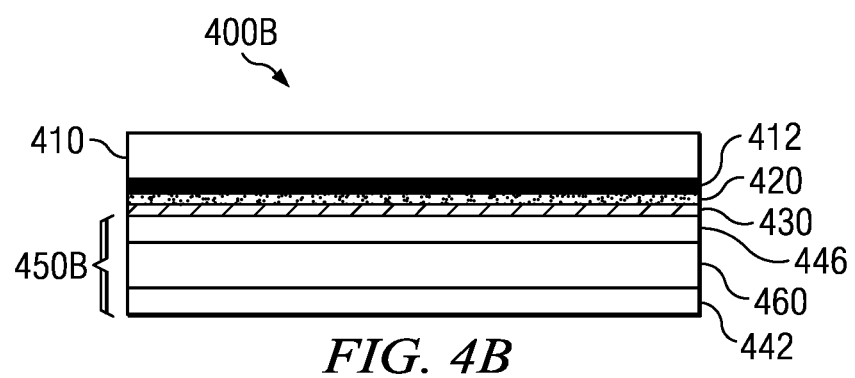
FIG. 4b depicts a magnified schematic cross-section of a bio-based multi-layer flexible film.

A snack food package was also made out of the film illustrated by FIG. 4B. Referring to the Example in FIG. 4B, the multi-layer film 400B also has a print web 410 comprising an uncavitated biaxially oriented 3×4 film (oriented 3× in the machine direction and 4 times in the transverse direction). The composite 450B comprises a barrier web 460 that was co-extruded with an adhesion layer 446 comprising NATUREWORKS PLA 4060D and a sealant layer 442 also comprising NATUREWORKS PLA 4060D and anti-block. The barrier web 460 was made with a composition consisting essentially of NATUREWORKS 4032 PLA. The composite 450B was biaxially oriented 3× in the machine direction and 4× in the transverse direction. No inorganic fillers or cavitation stabilizers were added to any of the composite film layers, consequently the barrier web 440 was an uncavitated PLA film. A barrier layer 430 comprising aluminum was deposited onto the uncavitated composite 450B and the metalized composite was adhered to the reverse printed uncavitated print web with a polyurethane adhesive. This multi-layer flexible film 400B was then made into a snack food package having two transverse seals and a back seal by methods well known in the art.

At ambient temperatures, PLA is a brittle glass-like solid, similar to "crystal" polystyrene. Consequently, one problem with multi-layer films made from uncavitated film layers is that the films can be very loud when handled by a consumer. The Applicants of the present invention, however, have discovered that packages made from bio-based multi-layer flexible films having at least one cavitated layer are much quieter when handled by consumers than packages made from film having no cavitation.

Applicants herein compared the sound produced during handling of snack food packages made from cavitated film 400A with uncavitated film 400B. To measure the sound level produced by each package, the package being measured was placed on a bench top approximately six inches away from a RadioShack Sound Level Meter (CAT No. 33-2055 A), with its range set to 80 low. Both sides of the package were then squeezed six times using both hands, and the highest sound level reading shown on the meter was recorded. The uncavitated PLA exhibited a maximum sound level reading of 90 dB, whereas the cavitated PLA had a maximum sound level reading of 86 dB.

Because the measurement of decibels is on a logarithmic scale, it is worth noting that perceptible differences in decibel levels (hereinafter "dB") can occur at relatively small incremental changes in the decibel level. For example, a change of 1 dB is imperceptible, a change of 3 dB is barely perceptible, but a change of 5 dB is a clearly noticeable change. A change in 10 dB is about twice as loud and a change of 20 dB is about four times as loud. The difference between the sound emitted by the cavitated PLA snack food package 400A was noticeably lower than the sound emitted by the uncavitated PLA snack food package 400B.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

While this invention has been particularly shown and described with reference to a preferred embodiment, it will be understood by those skilled in the art that various changes in form and detail may be made therein without departing from the spirit and scope of the invention.

What is claimed is:

1. A method for making a cavitated bio-based composite comprising the steps of:
    a) providing a molten sheet comprising inorganic filler, polylactic acid, and a bio-based cavitation stabilizer, wherein said bio-based cavitation stabilizer comprises between 5% and 20% by weight of the sheet and wherein said inorganic filler comprises between 12% and 25% by weight of the sheet;
    b) orienting said sheet between 2× and 3× in a machine direction; and
    c) orienting said sheet between 4× and 7× in a transverse direction, wherein said orienting steps produce a film having a density between about 16% and about 29% lower than a film substantially free of inorganic filler and cavitation stabilizer.

2. The method of claim 1 wherein said bio-based composite is co-extruded with a sealant layer.

3. The method of claim 1 wherein said bio-based composite is co-extruded with a primer layer.

4. The method of claim 1 wherein said inorganic filler comprises calcium carbonate.

5. The method of claim 1 wherein said cavitated bio-based composite is adhered to a PLA print web that is not cavitated.

* * * * *